Figure 1:
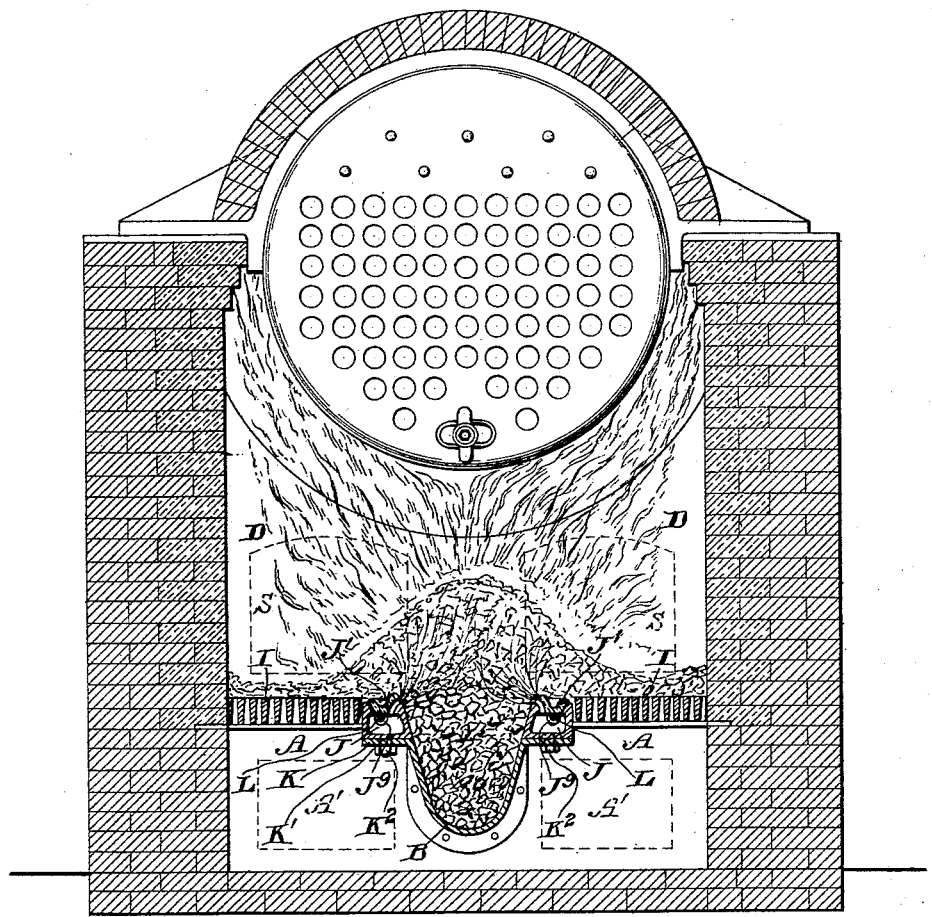

(No Model.) 7 Sheets—Sheet 1.

E. W. JONES.
BOILER OR OTHER FURNACE.

No. 569,207. Patented Oct. 13, 1896.

Witnesses

Inventor
Evan W. Jones
Attorneys (No Model.) 7 Sheets—Sheet 2.

E. W. JONES.
BOILER OR OTHER FURNACE.

No. 569,207. Patented Oct. 13, 1896.

Witnesses
Inventor (No Model.) 7 Sheets—Sheet 3.

E. W. JONES.
BOILER OR OTHER FURNACE.

No. 569,207. Patented Oct. 13, 1896.

Witnesses
Severance
C. C. Hines

Inventor
Evan W. Jones
by Mason Fenwick and Lawrence
Attorneys (No Model.) 7 Sheets—Sheet 4.

E. W. JONES.
BOILER OR OTHER FURNACE.

No. 569,207. Patented Oct. 13, 1896.

Witnesses
Severance
C. C. Hines

Inventor
Evan W. Jones
by Mason, Fenwick and Lawrence
Attorneys (No Model.) 7 Sheets—Sheet 5.
E. W. JONES.
BOILER OR OTHER FURNACE.
No. 569,207. Patented Oct. 13, 1896.
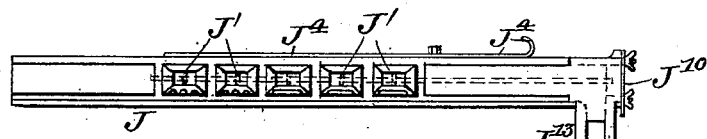
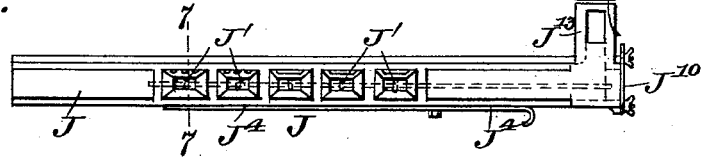
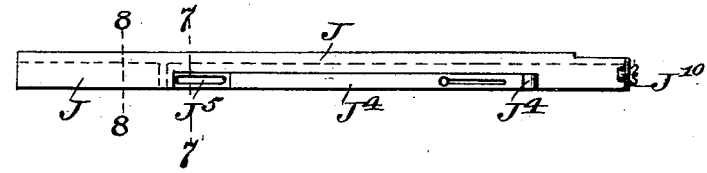
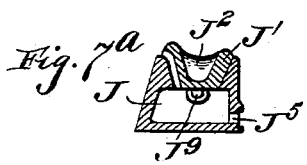
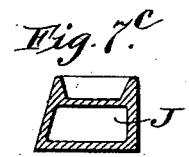
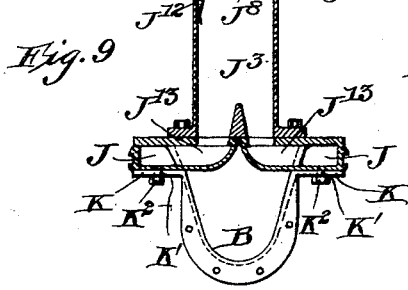
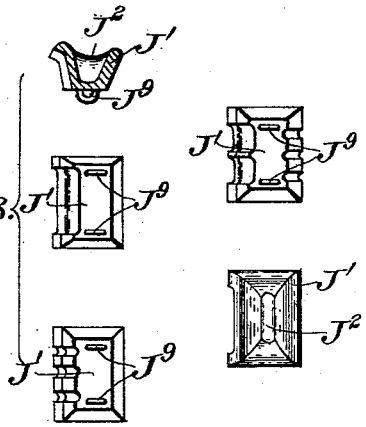
Witnesses
Severance
C. C. Hines
Inventor
Evan W. Jones
by Mason, Fenwick & Lawrence
Attorneys (No Model.) 7 Sheets—Sheet 6.
E. W. JONES.
BOILER OR OTHER FURNACE.
No. 569,207. Patented Oct. 13, 1896.
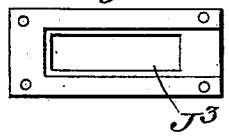
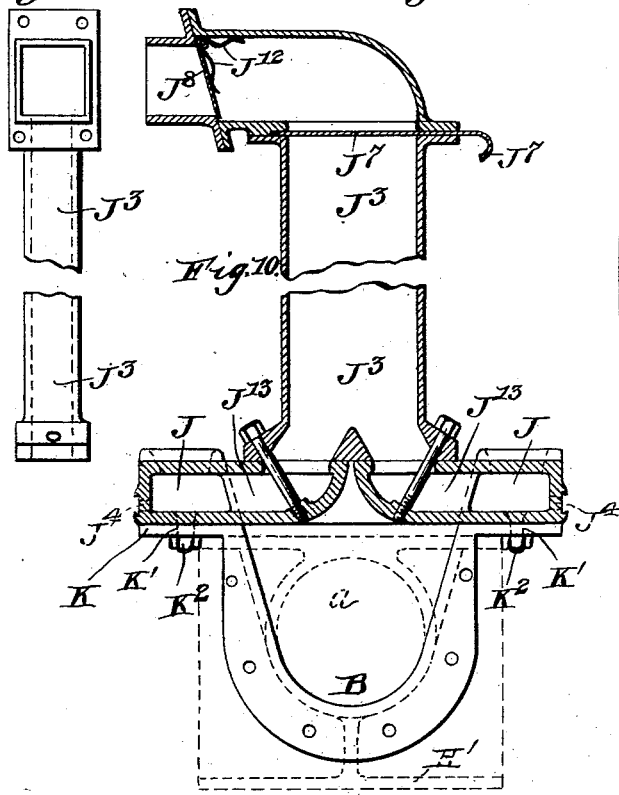
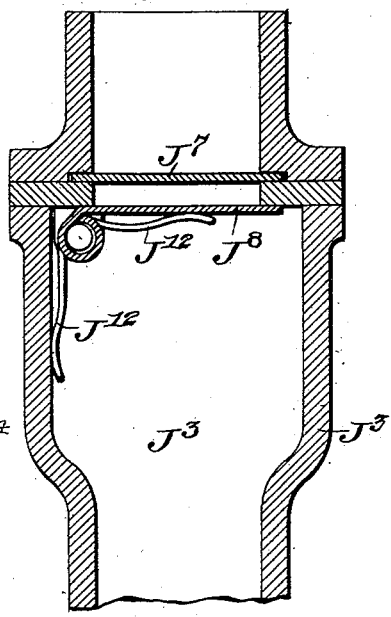
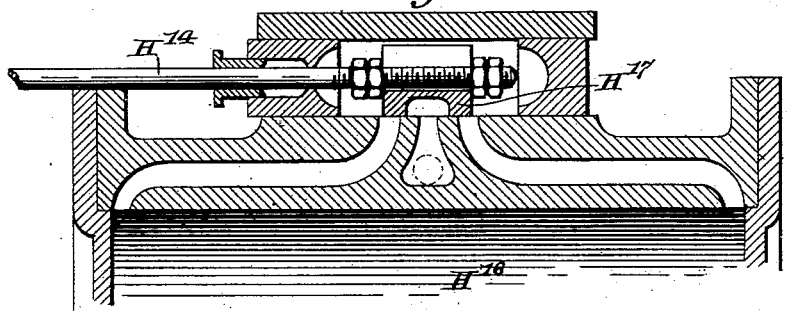

(No Model.) 7 Sheets—Sheet 7.
E. W. JONES.
BOILER OR OTHER FURNACE.
No. 569,207. Patented Oct. 13, 1896.
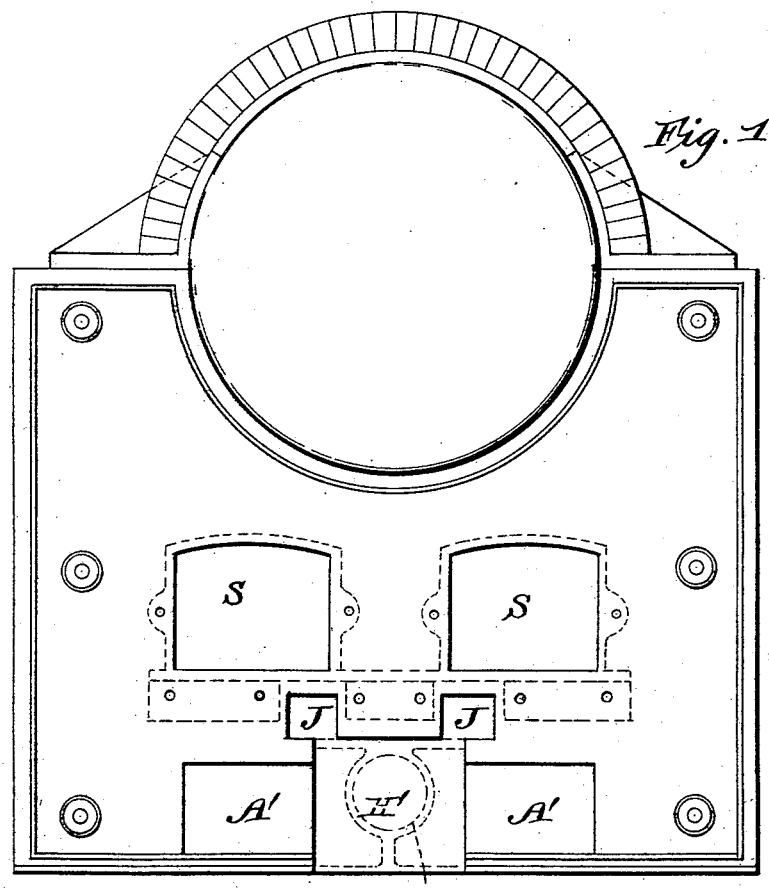
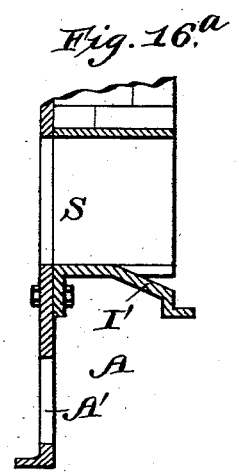
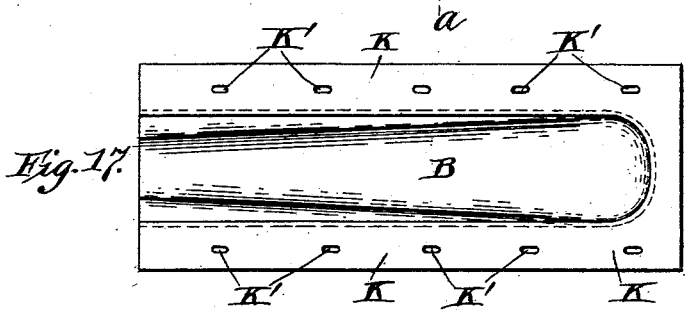
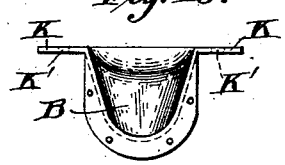
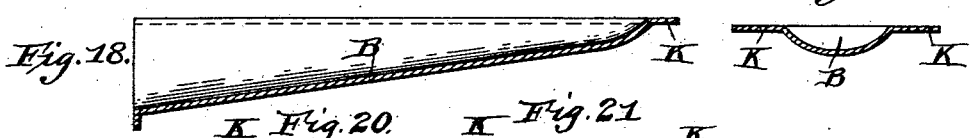
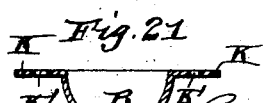

UNITED STATES PATENT OFFICE.

EVAN WILLIAM JONES, OF PORTLAND, OREGON, ASSIGNOR TO THE JOGADA FURNACE COMPANY, OF CHICAGO, ILLINOIS.

BOILER OR OTHER FURNACE.

SPECIFICATION forming part of Letters Patent No. 569,207, dated October 13, 1896.

Application filed May 13, 1893. Serial No. 474,121. (No model.)

*To all whom it may concern:*

Be it known that I, EVAN WILLIAM JONES, a citizen of the United States, residing at Portland, in the county of Multnomah and State of Oregon, have invented certain new and useful Improvements in Boiler or other Furnaces; and I do hereby declare the following to be a full, clear, and exact description of the invention, such as will enable others skilled in the art to which it appertains to make and use the same.

My invention relates to improvements in boiler or other furnaces, and especially to that type of furnace patented to me August 27, 1889, No. 469,792, and March 1, 1892, No. 470,052.

My present invention consists in a novel construction, combination, and arrangement of means, as hereinafter described and claimed, in furnaces in which the fuel is forced into the mass of burning fuel from a point below said mass instead of being discharged on top of said mass of burning fuel, said means serving to force the necessary supply of air directly over the fresh or green fuel and at the same time under and through the burning fuel, thereby causing the gases from the green fuel and the air supplied to become thoroughly mixed before they pass through the burning fuel and off into the flue or flues, said means also serving to regulate the proper amount of air and fuel and thus insure complete combustion, said means also providing for the removal of clinkers and ashes and avoiding the waste of fine fuel, and the construction and combination being such that clinkers and ashes can be removed at any time without interfering with the perfect operation of the furnace and practically all the fuel burned without depending upon the side grates for a supply of air, although the side grates may at any time during the operation of the furnace be used for the purpose of supplying air to the fuel that may be contiguous to and on said side grates by opening the dampers provided for that purpose in the ash-pits, said means also providing for the easy removal and replacing of parts that are liable to become injured by the action of the heat, said means also operating to prevent gas from the furnace from backing into the air-pipes, said means also providing for the distribution of air in the furnace in quantities required at the different points, the said means also providing for thoroughly mixing the air and gas of the fuel before said air and gas are forced through the burning fuel.

The improved means hereinbefore referred to are illustrated in the accompanying drawings, in which—

Figure 2:
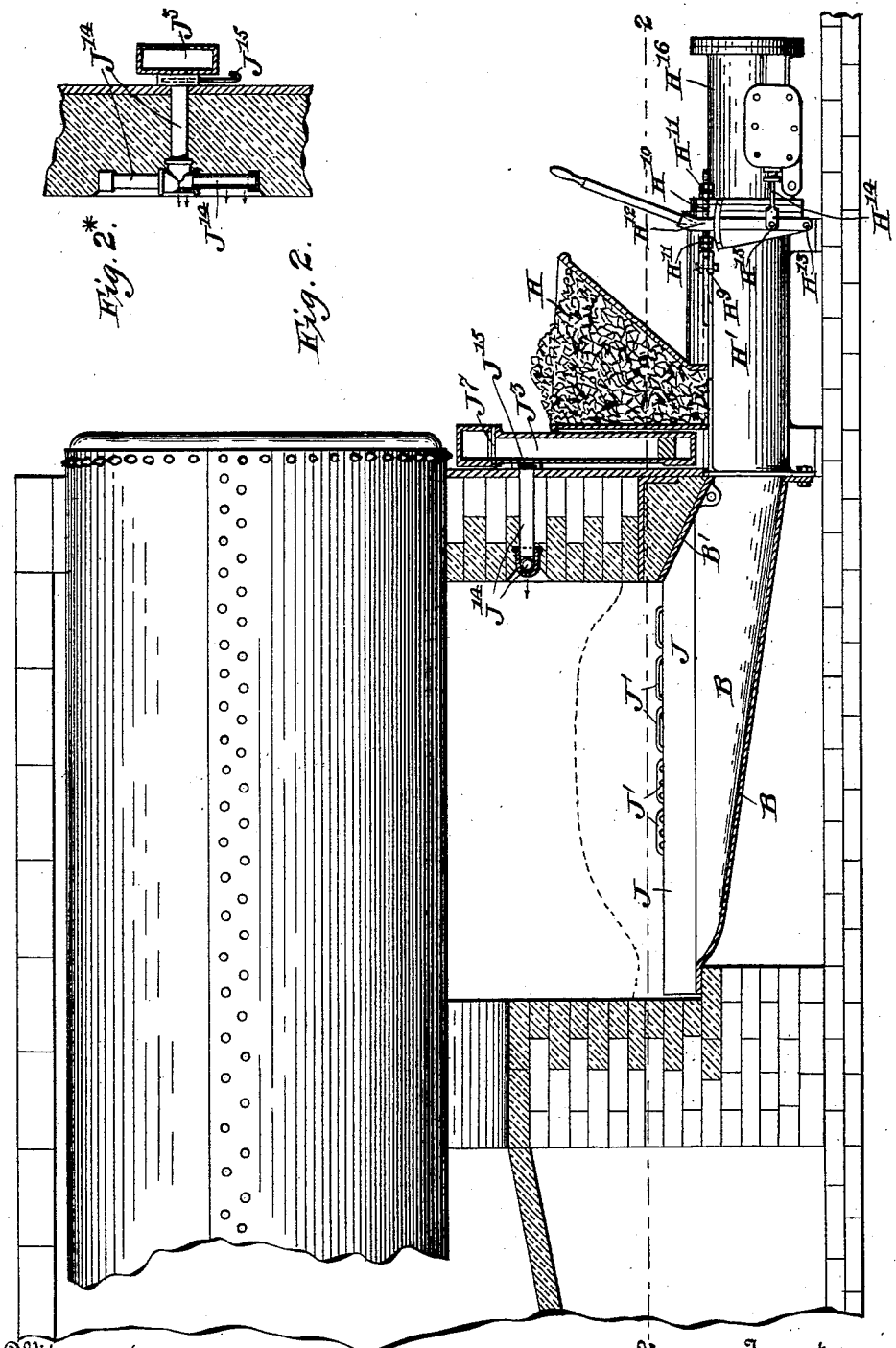
Figure 3:
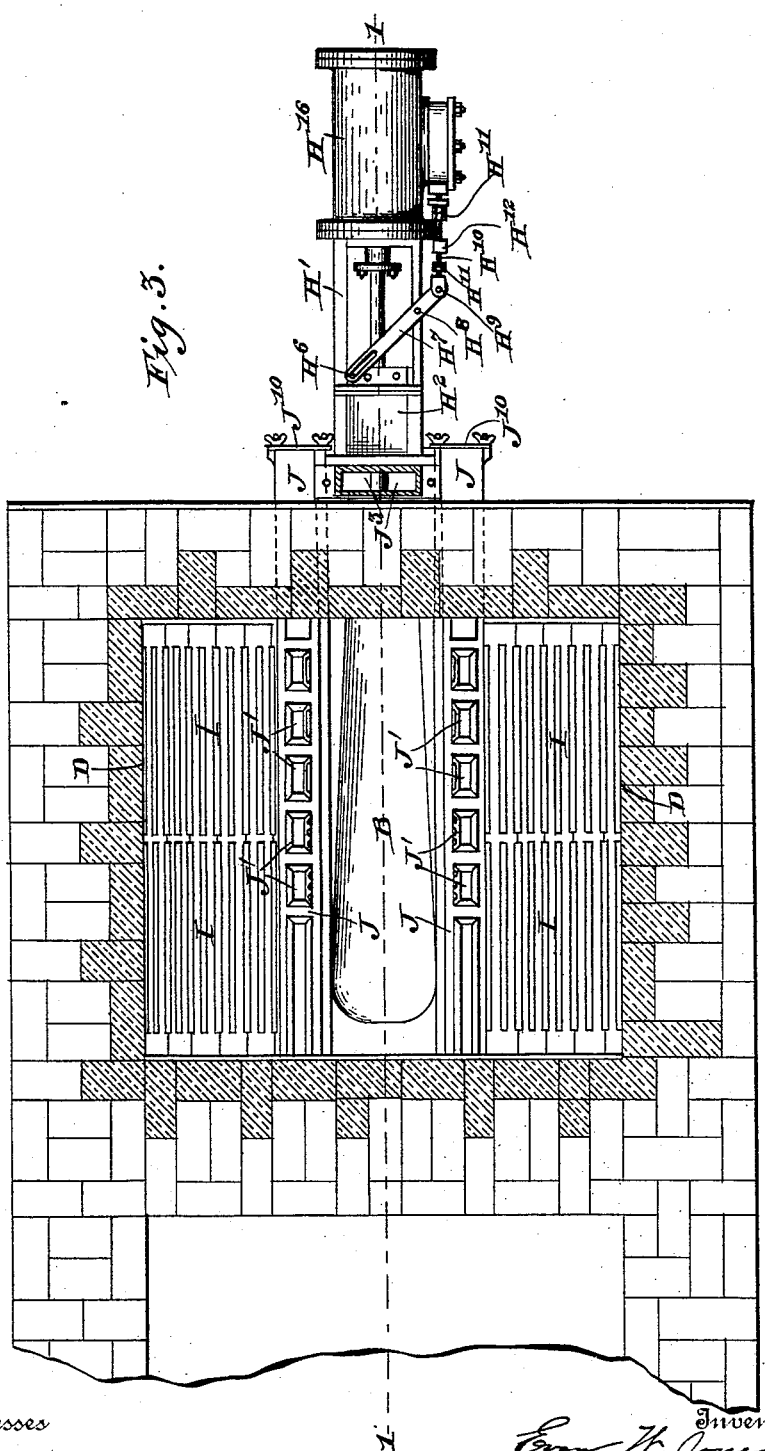
Figure 4:
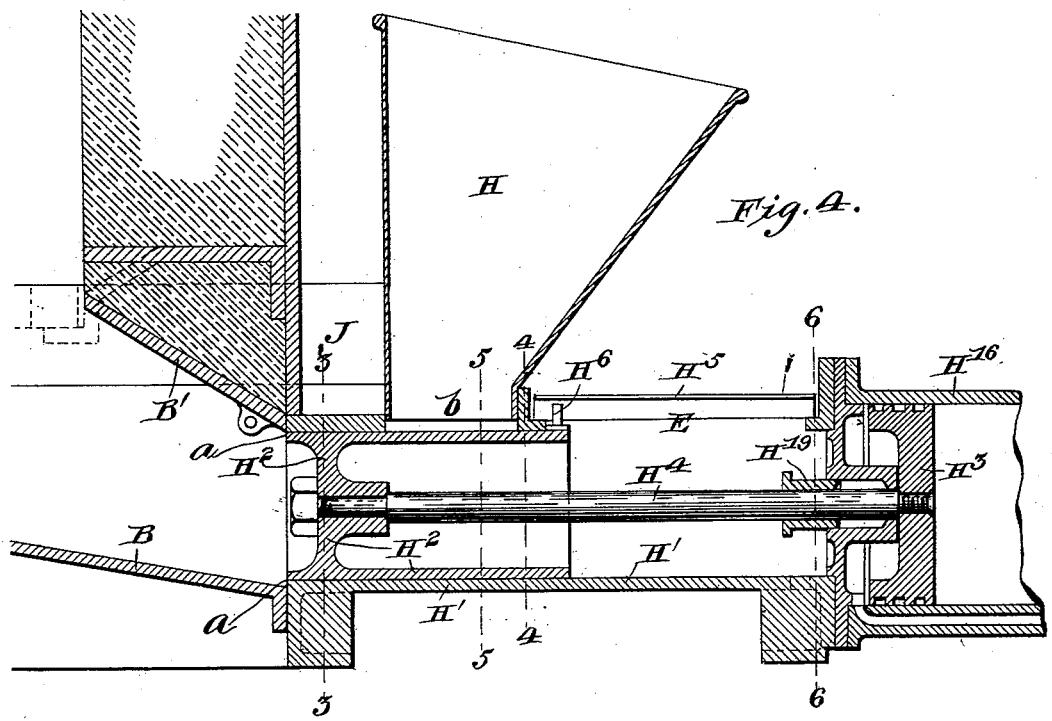
Figure 23:
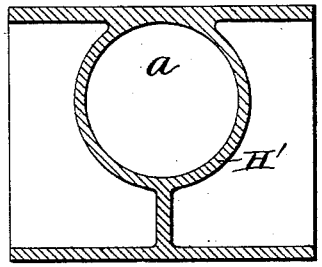
Figure 24:
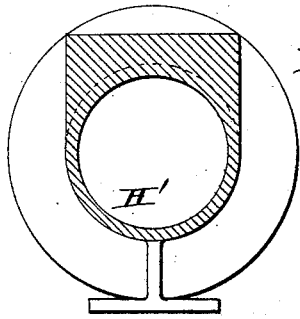
Figure 25:
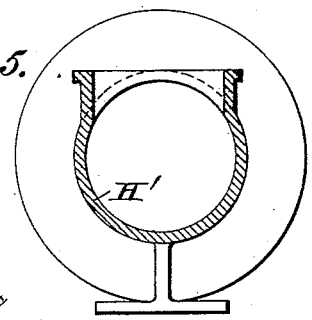
Figure 26:
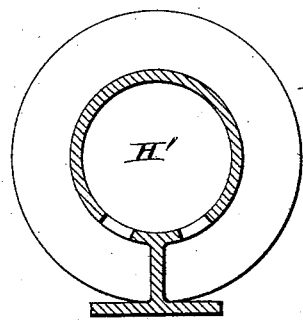

Figure 1 is a vertical cross-section of my invention as applied to a brick boiler-furnace; Fig. 2, a broken vertical longitudinal section on the line 1 1 of Fig. 3. Fig. 3 is a broken plan view on the line 2 2 of Fig. 2. Fig. 4 is an enlarged vertical longitudinal section of the feed-box, hopper, ram, and guide shown in Figs. 2 and 3. Fig. 5 is a detail view of the air-distributing pipes or twyers and the connections thereof. Fig. 6 is a side elevation of one of the twyers. Fig. 7 is a longitudinal section of the same. Fig. $7^a$ is a cross-section on the line 7 7 of Figs. 5 and 6 of the twyers with removable protecting-block in place. Fig. $7^b$ is a similar section on the line 7 7 of Figs. 5 and 6, the block being out of place. Fig. $7^c$ is a section on the line 8 8 of Fig. 6. Fig. 8 represents a detail view of the removable block in different preferred forms. Fig. 9 is a broken sectional view and a vertical plane through the air-supplying pipes and air-distributing pipes or twyers. Fig. 10 is an enlarged vertical section of the air-supply pipe and cross-section of its branches as applied in relation to the twyers and the magazine. Fig. 11 is an enlarged vertical section of a modified construction of air-pipe for twyers. Figs. 12 and 13 are detail views of an air-supply pipe. Fig. 14 is an enlarged vertical section of another modified construction of pipe for twyers. Fig. 15 is an enlarged vertical longitudinal section of the valve for controlling the influx and efflux of the steam for operating the ram. Fig. 16 is a front elevation, and Fig. $16^a$ a broken vertical cross-section, of a boiler-front for a brick furnace, showing a bearing-bar for supporting the front end of the side grates. Figs. 17, 18, 19, 20, 21, and 22 are detail elevational and sectional views of the magazine or fuel-chamber. Figs. 23, 24, 25, and 26 are detail cross-sections, respectively, on lines 3 3, 4 4, 5 5, and 6 6 of Fig. 4, the same being views of the feed-box.

In the drawings the furnace is shown provided with ash-pits A A and a fuel-feeding chamber or magazine B, the latter being arranged between the grates, and its bottom being in cross-section segmental in form and its sides divergent from one another. The bottom is inclined upwardly from front to rear of the magazine and forms a guide and support of very considerable depth at its rear end, and of almost no depth at its front end. The chamber or guide thus formed gradually diminishes in depth and increases in width as it rises toward the forward end of the magazine.

B' is an inwardly and upwardly extended hood or plate attached to the inner front wall of the fire-chamber and overhanging the rear portion of the magazine.

The fuel-feeding magazine B has a mouth coinciding in size and location with the feed-entrance opening $a$ in the front wall of the fire-chamber D, said mouth being fitted to said opening as shown in said figure or in any other suitable or substantial manner, while the forward end of said magazine is supported by a ledge of the bridge-wall of the furnace or in any other firm manner.

Outside and coinciding with the mouth of the magazine B a fuel-box and ram-guide H' is provided. This box and guide is shown in detail in Figs. 23, 24, 25, and 26. Just over the opening $b$ in the top of said box a fuel-hopper H is arranged, the same being of any desirable size which adapts it for containing the requisite quantity of fresh fuel. Inside the fuel-box H' is a ram $H^2$ for forcing the fresh fuel into the magazine B, and therefrom (after it has formed a long, tapered, elevated, central pile, which in vertical section longitudinally is of wedge form and of approximately A form in cross-section) onto the side grates I, which are on a plane with the top of air pipes or twyers J, as shown in Fig. 1. The ram $H^2$ may be similar to the type shown in my aforesaid Letters Patents and operate in substantially the same manner, and the power employed for actuating the ram may be either steam, compressed air, or hydraulic pressure, or a cam, eccentric, rack and pinion, or a screw may be adopted; but the preferable means are those illustrated in Figs. 2, 3, 4, and 15 of my present drawings, a description of which will be presently given. When the plunger $H^2$ is drawn back, the fuel in the hopper H falls into the fuel-box H' under said hopper, and on the return stroke of the plunger the fresh fuel is forced into the magazine B, and during the operation of the furnace and the burning away of the fuel that has been previously supplied the fuel will be forced higher and higher along and on the inclined segmental bottom of the laterally-closed magazine until it reaches and becomes completely impacted against the superincumbent mass of burning fuel and thus caused to become a part of the burning fuel, the green fuel always occupying a position immediately under the burning fuel, and thus at all times forming a firm support for the burning fuel, while it, the green fuel, is placed in such a position that there is no escape for the gas that is liberated from it except through the highly-inflamed burning fuel above and lateral to it on both sides.

The fuel-magazine B can be made of brick, iron, or fire-clay, and it can be curved with a slight upward inclination, or the incline may be on a straight line, but its inclination should always be suitable for insuring a free gliding up of the fresh fuel which is being forced into the furnace by the ram. The preferable plan of construction is to make the magazine of iron in the form shown in detail in Figs. 17, 18, 19, 20, 21, and 22 and to provide it with bolting-flanges K on its upper side edges and in said flanges to provide slots K' for the passage of the bolts $K^2$, by which it is bolted to the air-tubes or twyers J, so that the air-pipes or twyers may have freedom to expand independently of the fuel chamber or magazine.

The form of the magazine represented is well adapted for keeping the fuel in a deep body, where it is first fed in, and by its depth decreasing gradually to almost nothing and its width gradually increasing up to the point of the discharge of the fuel into the burning mass a result of the highest importance in the operation of feeding fuel to a furnace is accomplished.

The construction and operation of the piston $H^3$, that controls the forcing-ram $H^2$, are as follows: Referring to the drawings, Figs. 2, 3, 4, and 15, it will be seen that on top of the ram $H^2$ is secured a projecting pin $H^6$. This pin projects through the slotted end of lever $H^7$, which is fulcrumed at $H^8$ and is connected to a rod $H^{10}$ by a joint $H^9$. The rod $H^{10}$ passes loosely through an opening in the upper end of a lever $H^{12}$, and this lever $H^{12}$ is fulcrumed at $H^{13}$, while by means of a valve-stem $H^{14}$ a valve $H^{17}$ of a steam-cylinder $H^{16}$ is connected to the lever $H^{12}$ by means of a joint $H^{15}$. The result of this construction and combination is that the motion of the plunger $H^2$ gives, through the slotted lever $H^7$, rod $H^{10}$, lever $H^{12}$, and valve-stem $H^{14}$, a reduced reverse motion to the valve $H^{17}$. On the rod $H^{10}$ are adjustable tappets $H^{11}$. When the valve, by means of the lever $H^{12}$, is placed at either end of its stroke, the pressure forces the piston $H^3$ and plunger $H^2$ to the opposite end of its stroke. Thereupon one of the tappets on the rods $H^{10}$ then strikes the lever $H^{12}$ and places the valve in the position shown in Fig. 15, thereby closing the exhaust and putting steam on both sides of the piston at the same time. The same result is attained at the other end of the stroke. The object of this construction is to cushion the piston and avoid slamming at each end of the stroke. Should the valve be required to operate automatically, this can be effected by the addition of certain parts illustrated in Figs. 9 and 10 of my patent, dated March 1, 1892, No. 470,052, and as described in the said patent. The air-pipes or twyers J are arranged on the flanges K at the top of the sides of the magazine B and bolted in position by the bolts $K^2$, passed through the slots K'. These twyers are shown in detail in Figs. 5, 6, 7, and 8. As the upper sides of the twyers are exposed to the very intense action of the fire, it becomes necessary to provide against their rapid destruction, or provide a protection to them at said sides, and thus prevent their rapid burning out; also, to make provision for new top portions being supplied, in the event of said portions burning out; and to these ends short twyer dies or blocks J' are removably fitted in the upper sides of the air-pipes or twyers, and these blocks have in their upper sides cavities or deep depressions $J^2$, in order that slag from the burning fuel may deposit therein and form a fireproof coating. By this means a very simple and effective protection to the twyer-pipes against the action of the intense heat is secured.

In the sides of the blocks J' air channels or grooves are provided, which may all be of equal capacity, but I preferably make the grooves of different shapes and capacities, as shown in Fig. 8. On the under side of the blocks J' are projecting staples $J^9$ for the reception of fastening-rods L. The blocks J' fit closely in the openings in the upper sides of the twyers, and are held in position on the pipes or twyers by means of the rods L, which are introduced into the pipes by removing the covers $J^{10}$ at the ends of the pipes or twyers J. The rods are of nearly the length of the space inside of the twyers, and after being passed through the staples $J^9$ of all the blocks occupy positions on the under sides of the blocks J'. After the rods are in position the covers $J^{10}$ are replaced, and all the blocks are thus securely confined in position. The grooves of different or equal capacities in the sides of the blocks for the air which is forcibly passed through the chambers of the air-distributing pipes or tubes, and therefrom is discharged into the fuel immediately at the top of the twyers, being guarded against choking by the overhanging edges of the blocks.

My reason for preferring to make the air-passages of different capacities is that I find there is a tendency to force more fuel up at the front end of the furnace than at the back end. Hence, in order to keep a level fire in the furnace, it is necessary to burn the coal a little faster at the front end of the furnace than at the back end, and as the blocks are of different capacity they can be located to give the proper amount of air at the proper points in the furnace.

On the outside of each twyer-pipe J is an opening $J^5$, which is covered by a slide $J^4$. When the furnace is in operation, the slides $J^4$ are closed, but when it is necessary to get rid of any fine dirt or ashes that may have found entrance to the inside of the twyers J it is only necessary to withdraw the slide $J^4$ and allow the pressure of the inflowing air to force all the dirt into the side ash-pits A. I find this construction and combination of these twyer-pipes a great improvement over the twyers having water-circulation passages, as illustrated in my patent of March 1, 1893, No. 470,052, because much trouble is experienced with the water-circulating jacket on account of the jacket becoming clogged with sediment, whereas with the twyer-pipes above described, while rapid destruction is avoided, I have very little projection above the air-slots into the fire, and I find the slag, with this construction, affords ample protection, and the blocks J' being in short sections can be easily removed and replaced if any of them should become damaged; and I also find it quite an advantage to be able to locate the blocks in the furnace so as to supply more or less air at given points.

On the outer ends of the twyer-pipes J are provided branches $J^{13}$, to which an air-pipe $J^3$ is secured. An enlarged view of this air-pipe is shown in Figs. 9 and 10. In connection with the air-pipes J a cut-off slide $J^7$ is provided for the purpose of shutting off the supply of air when the furnace is not in operation, and also a back-pressure valve $J^8$ is provided for preventing the gas flowing back into the air-pipe when the blower is not in operation, said valve having a spring $J^{12}$ for closing it as soon as the blower stops.

By referring to Fig. 4 it will be seen that the front end of the guide H' is adapted to have the ram $H^2$ fit closely in it when said ram is in the position shown in said figure of the drawings. The object of this construction is to prevent a supply of air entering the furnace at this point when the ram is in the opening $a$, also to form a solid support for the boiler-front, as shown, while an opening is provided under the hopper through which the fuel drops into the feed-box when the ram is withdrawn, as before described. An opening E is provided in the ram-guide. This opening is covered by a loose plate $H^5$, on removing which access to the packing-gland 19 of the cylinder is afforded. The plate $H^5$ also prevents dirt and coal from falling into the box H'. I find from experience that as the fresh fuel is forced up into the fire the tendency is to force the resulting ashes and clinkers over onto the side grates, and as the side grates are not depended upon for the supply of air to carry on combustion such displaced ashes and clinkers may be allowed to pile over onto them to any reasonable depth. The side grate-bars may be stationary and may be placed at any angle across the furnace, or they can be made to dump or to shake down the ashes and clinkers, or the ashes and clinkers can be removed through the doors S S (shown in dotted lines in Fig. 1) and in boiler-front shown in Fig. 16.

My construction and combination permit the ashes and clinkers to remain on the side grates any reasonable length of time, so that the front doors need not be opened oftener than once or twice a day for the removal of ashes and clinkers; and if a grinding or dumping grate is provided it will not be necessary to open the furnace-doors at all, as peep-holes can be provided to see the condition of the fire at all times.

I consider it an important feature of this furnace to be able to keep the furnace-doors closed for such long periods of time, as it prevents a vast amount of cold air from entering the furnace above the fires, said cold air not only absorbing a large amount of heat, but always having a tendency to injure the boiler by coming in contact with the highly-heated sheets over the fire, as well as tending to produce sudden and unequal contraction of the plates and flues nearest the door.

By the construction of the fuel chamber or magazine B with air-tight bottom and sides, which are inclined outwardly from their lower to their upper edges, the fuel is packed tight between the walls of the magazine from the bottom to the top and is allowed to diffuse laterally on both sides after it has been forced up to a plane on a level with the top of the twyer-pipes J, and thus the air that is forced under pressure through the slots in the twyer-pipes J will meet with less resistance from above than below. Consequently the air will pass up through the burning fuel instead of down into the green fuel, and the result is that combustion takes place only above the air-openings, and thus the hottest part of the fire will be on top next to the boiler, while the coal about or near the air-openings will be coking and expanding into a spongy mass, thus allowing the forced currents of air from the slots in the twyers to penetrate the whole mass of fuel above the air supply, and said currents of air will mix with and carry with them all the gas that is being slowly liberated from the green fuel through the highly-heated burning fuel above and thereby effect complete combustion.

In the furnace herein described the fresh or green fuel is forced up into the body of the burning fuel, and the gases which are liberated from this fuel are first mixed with the incoming air and then are forced through the body of burning fuel, and the air for promoting combustion is supplied at the points where the fresh fuel is supplied to the mass of burning fuel above it, and the said furnace herein described, as well as those described in my aforesaid patents, differs essentially from other furnaces which are provided with fuel-forcing means and the fuel-chambers of which do not constitute both supporting-beds for the underlying mass of fuel as well as the superincumbent mass, and do not serve for conducting the fresh fuel directly up within the fire-chamber amid the mass of burning coal during the operation of forcing the fresh fuel from the fuel-box into the fire-chamber by the ram, and do not provide means for supplying air directly over the green fuel, but under and through the burning fuel independent of the grates, and do not provide means for the easy removal of clinkers and ashes, and do not provide means for the protection of the air-supply pipes from the action of the fire, nor for keeping the fuel-supply opening tightly closed when the ram is not in operation, and which do not provide means for preventing the backing of gas into the air-pipes when the blower is not in operation, and do not provide a convenient and serviceable feed-box and ram-guide, nor means whereby parts subjected to the influence of the heat may be readily removed and replaced.

For the purpose of starting the fires and removing ashes and clinkers the fire-doors S S and side-grates I are provided, in combination with ash-pits A A and dampers. (Shown in dotted lines at A' A', Figs. 1 and 16.) After the fires are started and the blower has been put in operation the said dampers are closed, and all the air supplied to the furnace is taken through the twyer-pipes J and thoroughly mixed with the gas from the green fuel, and is then forced through the burning fuel, thus providing an ample supply of air to combine with the carbonaceous as well as the gaseous elements of the fuel.

For the purpose of introducing air over the top of the fire, when desirable, an air-pipe $J^{14}$ and cut-off slide $J^{15}$ may be provided and used, as illustrated in Fig. 2, in combination with the air-pipe $J^3$ and cut-off $J^7$. The air-pipe $J^{14}$ is embedded into the brickwork in the front end of the furnace, and is thereby protected from the action of the heat, and in the side of this air-pipe a number of small holes are provided, and by adjusting the cut-off slide any desired quantity of air can be forced over the fire in a thin sheet for the purpose of combining with any gas that may have failed to come in contact with the proper quantity of air from below the fire.

I contemplate employing all the novel features of construction, arrangement, and combination herein described in various kinds of furnaces to which they may be applicable, that is, furnaces under either horizontal, upright, or inclined boilers, with stationary, locomotive, or marine boilers, whether the furnaces are constructed of brick or otherwise and whether the boilers require circular, square, or oblong fire-boxes, and whether the boilers are constructed of fire-tubes, water-tubes, or flues. Also the features of my invention may be employed in all kinds of heating furnaces for puddling, calcining, roasting, desulfurizing ores, and in fact all furnaces requiring intense heat, economical consumption of fuel, and free from smoke.

What I claim as my invention is—

1. A fuel-magazine for an under-feed furnace, said magazine having flaring sides gradually decreasing in depth rearwardly and a curved or inclined bottom and horizontal attaching-flanges at its upper edges which latter are provided with longitudinal slits and twyers secured to said flanges through the longitudinal slits, to thereby permit the twyers to expand and contract, substantially as described.

2. In an under-feed furnace with a fuel-opening below the line of the fire, a solid, stationary, slightly-inclined fuel-bed having flaring sides gradually decreasing in depth rearwardly, and a curved or inclined bottom and horizontal attaching-flanges at its upper edges which latter are provided with longitudinal slits, twyers secured to said flanges through the longitudinal slits which permit them to expand and contract, and a ram or plunger for forcing the fuel into the magazine, substantially as described.

3. In an under-feed furnace provided with a fuel-opening below the line of the fire, a stationary, slightly-inclined fuel-bed, twyers located near the top of the fuel-bed, removable, non-revoluble, channeled blocks or dies in said twyers having concavities in their upper surfaces with closed bottoms which are adapted to receive and permanently hold slag, which forms a fireproof protection to the twyers, substantially as described.

4. In an under-feed furnace provided with a fuel-opening below the line of the fire, a stationary slightly-inclined fuel-bed, longitudinal movable twyers located near the top of the fuel-bed, removable non-revoluble channeled blocks or dies in said twyers having concavities in their upper surfaces with closed bottoms which are adapted to receive and permanently hold slag which forms a fireproof protection to the twyers, substantially as described.

5. A furnace with a fuel-chamber having an upwardly-expanding cross-section and sides gradually decreasing in depth rearwardly and located below the line in which the air is forced into the fuel, twyers located near the top of said chamber and having removable blocks or dies, which latter are formed with staples or eyes on their under sides and removable confining-rods passed through the eyes, substantially as described.

6. A furnace with a fuel-chamber having an upwardly-expanding cross-section and sides gradually decreasing in depth rearwardly, and located below the line in which the air is forced into the fuel, twyers located near the top of said chamber and provided with removable blocks or dies having air-channels in their sides of different sizes, staples or eyes on the under side of the blocks and removable rods passed through the eyes for connecting the blocks, substantially as described.

7. A furnace with a fuel-chamber having an upwardly-expanding cross-section and sides gradually decreasing in depth rearwardly, and located below the line in which the air is forced into the fuel, twyers near the top of said chamber with removable blocks having variable air-channels in the sides and fitted to the tops of the air pipes or twyers, staples $J^9$ on the under side of said blocks, confining-rods passed through the staples; side branches $J^{15}$ on the air-pipes; removable covers $J^{10}$ on the end of the air-pipes; opening $J^5$ and slides $J^4$, substantially as described.

8. In an under-feed furnace provided with a fuel-opening below the line of the fire, a gradually, upwardly-inclined fuel-bed, twyers near the top of said bed, removable, stationary, blocks or dies having variable air-channels in their sides and fitted to the twyers, concavities in the upper surfaces of the blocks having closed bottoms for receiving and permanently holding slag, staples or eyes on the under side of the blocks, and confining-rods passed through the eyes, substantially as described.

9. In a furnace provided with an upwardly-expanded fuel-chamber closed at bottom and sides, and having connection with an air-supplying apparatus at or near its top, air-pipes $J$ and $J^3$, cut-off slide $J^7$, and back-pressure valve $J^8$, substantially as described.

10. In an under-feed furnace with a fuel-opening below the line of the fire, a magazine gradually decreasing in depth toward the rear and provided with a curved or inclined bottom and horizontally-attaching flanges to its upper edges provided with longitudinal slits, twyers secured to said flanges through the longitudinal slits to permit expansion and contraction, an air-distributing pipe for forcing air over the top of the fire, and a ram or plunger for forcing the fuel into the magazine; substantially as described.

In testimony whereof I hereunto affix my signature in presence of two witnesses.

EVAN WILLIAM JONES.

Witnesses:
JNO. L. HUNT,
R. E. WILLIAMS.